United States Patent [19]

Neefe

[11] 4,414,375
[45] Nov. 8, 1983

[54] OXYGEN PERMEABLE CONTACT LENS MATERIAL COMPRISING COPOLYMERS OF MULTIFUNCTIONAL SILOXANYL ALKYLESTERS

[76] Inventor: Russell A. Neefe, 1441 Pinnacle Peak, DeSoto, Tex. 75115

[21] Appl. No.: 300,189

[22] Filed: Sep. 8, 1981

Related U.S. Application Data

[63] Continuation-in-part of Ser. No. 185,000, Sep. 2, 1980, Pat. No. 4,306,042.

[51] Int. Cl.³ .......................................... C08F 230/08
[52] U.S. Cl. ..................................... 526/260; 526/79; 526/264; 526/265; 526/273; 526/279
[58] Field of Search .................. 526/279, 79, 273, 260, 526/264, 265

[56] References Cited

U.S. PATENT DOCUMENTS

| | | | |
|---|---|---|---|
| 4,189,546 | 2/1980 | Deichert et al. | 526/279 |
| 4,235,985 | 11/1980 | Tanaka et al. | 526/279 |
| 4,246,389 | 1/1981 | LeBoeuf | 526/279 |
| 4,254,248 | 3/1981 | Friends et al. | 526/279 |
| 4,260,725 | 4/1981 | Keogh et al. | 526/279 |
| 4,276,402 | 6/1981 | Chromecek et al. | 526/279 |
| 4,277,595 | 7/1981 | Deichert et al. | 526/279 |
| 4,306,042 | 12/1981 | Neefe | 526/75 |
| 4,327,203 | 4/1982 | Deichert et al. | 526/279 |

*Primary Examiner*—Melvyn I. Marquis
*Assistant Examiner*—Herbert J. Lilling

[57] ABSTRACT

An oxygen permeable contact lens fabricated from a copolymer of a multifunctional siloxanyl alkylester a monomer selected from the group consisting of, an ester of acrylic or methacrylic acid and from an ester of itaconic acid or mixture thereof. The copolymer can be made either hard, soft, or elasticmeric with improved oxygen permeability.

6 Claims, No Drawings

OXYGEN PERMEABLE CONTACT LENS MATERIAL COMPRISING COPOLYMERS OF MULTIFUNCTIONAL SILOXANYL ALKYLESTERS

This is a continuation-in-part of application Ser. No. 185,000 filed, Sept. 2, 1980, now U.S. Pat. No. 4,306,042 entitled; A METHOD OF MAKING A CONTACT LENS MATERIAL WITH INCREASED OXYGEN PERMEABILITY.

BACKGROUND OF THE INVENTION

The human cornea is an independent organism that obtains its sustaining oxygen from the tears of the eye. The oxygen consumption rate of the human cornea is approximated to be 2.8 ml/cm$^2$-hr. This value has been determined by Jauregui and Fatt, "Estimation of the Vivo Oxygen Consumption of the Human Corneal Epthelium" in the Americal Journal of Optometry and Archives of American Academy of Optometry, June, 1972, page 507.

Contact lenses have been made from various materials since the early 1950's. Table I illustrates some of the materials, the common term, its composition and its disadvantages.

TABLE I

| COMMON TERM | COMMON COMPOSITION | DISADVANTAGES |
|---|---|---|
| Hard | 95% + Polymethyl-methacrylate | Very low gas Permeability |
| Semi-Rigid | 90% + Cellulose Acetate Butyrate | Poor Stability |
| Soft | 60% + Poly-hydroxyethyl Metacrylate | Poor Durability |
| PMMA/Silicone | 40%-60% Poly-methylmethacrylate 40%-60% Siloxanyl alkyl ester | Marginal oxygen permeability & stability |
| Silicone | 10%-90% Phenyl-siloxanes and 10%-90% Methyl-vinylsiloxanes | Poor surface wettability & poor durability |

Attempts have been made in correcting these disadvantages. Some of these attempts have been somewhat successful, but not entirely. In U.S. Pat. No. 4,152,508, they deal with stability, but the increasing of oxygen permeability was never really attained, due to the use of non-oxygen permeable crosslinking agents. The use of dimethacrylates (the preferred embodiments) did improve the stability over that of U.S. Pat. No. 3,808,178, but did decrease oxygen permeability to some degree. Thus, a material with excellent oxygen and carbon dioxide permeability is preferable for metabolic action of the cornea. The surface of the material must be wettable and compatible with fluids of the eye.

SUMMARY OF THE INVENTION

The primary object of this invention is to provide a novel contact lens material which is prepared from a combination of monomers so as to have high oxygen, carbon dioxide permeability, and a hydrophilic surface. It would be preferable to have sufficient mechanical strength to permit precision machining and polishing.

Although, lenses could be fabricated by casting or molding if an elasticmeric material is preferable.

According to the invention a contact lens material is prepared by copolymerizing:

(a) from 5 to 90% by weight of a multifunctional siloxanyl alkyl ester monomer having two or more $\alpha,\omega$ terminally bonded through divalent hydrocarbon groups to an activated unsaturated groups with;

(b) an effective amount of a copolymerizable monomer up to 90% by weight selected from the group consisting of an ester of acrylic or methacrylic acid or from;

(c) an ester of itaconic acid or mixtures thereof;

(d) from 0.5 to 40% by weight of a hydrophilic monomer for a surface wetting agent;

(e) an effective amount of a copolymerizable monomer up to 20% by weight of an ester crosslinking agent.

Representatives of (a) a multifunctional siloxanyl alkyl ester monomer having two or more $\alpha,\omega$ terminally bonded through divalent hydrocarbon groups to an activated unsaturated groups included but not restricted to the following:

Tetrakis-(trimethylsiloxy) bis(methacryloxypropyl)-disiloxane

Tretakis-(trimethylsiloxy)bis(methacryloxypropyl)-dimethyltrisiloxane

Pentakis-(trimethylsiloxy)tris(methacryloxypropyl)tetramethylpentasiloxane

Hexakis-(trimethylsiloxy)tetrakis-(methacryloxypropyl)hexamethylheptasiloxane

Tris(methacryloxymethldimethylsiloxy)methacryloxypropylsiloxane

Tetrakis-(methacryloxymethyldimethylsiloxy)tetramethyl-cyclotetrasiloxane

Tetrakis-(methacryloxymethyldimethylsiloxy)siloxane

Representatives of (b) an ester of acrylic of methacrylic acid include by not restricted to the following:

Butyl acrylate and methacrylate
Cyclohexyl acrylate and methacrylate
2-ethyl acrylate and methacrylate
Glycidyl acrylate and methacrylate
Hexyl acrylate and methacrylate
Lauryl acrylate and methacrylate
Methyl acrylate and methacrylate
Stearyl acrylate and methacrylate Representatives of (c) esters of itaconic acid but not restricted to the following:

Butyl itaconate
Dibutyl itaconate
Methyl itaconate
Phenyl itaconate
Diphenyl itaconate Representatives of (d) a hydrophic monomer for a surface wetting agent include but not restricted to the following:

Acrylamide
2-Acrylamido-2 methyl propane sulfonic acid
t-Butylaminoethyl methacrylate
Dimethylaminoethylacrylate and methacrylate
N-(1,1-Dimethyl-3-Oxobutyl)-acrylamide
Glacial acrylic and methacrylic acid
Glyceryl acrylate and methacrylate
Itaconic acid
Propylene glycol monoacrylate and monomethacrylate
Ethylene glycol monoacrylate and monomethacrylate
Methacrylamide
Morpholinoethyl acrylate and methacrylate
Piperidinoethyl acrylate and methacrylate
Triethylene glycol methacrylate
N-vinyl pyrrolidone The preferred (e) an ester crosslinking agents include but not restricted to the following:
Bis(methacryloxypropyl)tetramethyldisiloxane
1,3 Bis(glycidoxypropyl)tetramethyldisiloxane
Divinyl Diphenyl Silane
Ethylene-Glycol diacrylate and dimethacrylate
Diethylene glycoldiacrylate and dimethacrylate
Trimethylpropane triacrylate and trimethacrylate
Triethyleneglycol diacrylate and methacrylate
Tetraethyleneglycol diacrylate and dimethacrylate The copolymers of this invention is prepared by conventional polymerization by either free radical initiators or by photoinitiators. Representatives of free radical initiators include but not restricted to the following:
Acetyl Peroxide
2,2, Azobis (2-Methylpropinionitrile)
Benzoyl Peroxide
t-Butyl Peroctoate
Caprylyl Peroxide
Decanoyl Peroxide
Diisopropyl Peroxydicarbonate
2,5-dimethyl-2, 5-bis (2-ethyl hexanoylperoxy)hexane
Lauroyl Peroxide
Tertiarybutyl Percotoate
Tertiarybutyl Peroxypivalate Representatives of photo-initiators include but not restricted to the following:
Benzoin
Benzophenone
2,2 Azobis(2-Methylpropionitrile)

THE PREFERRED EMBODIMENT

The following examples are presented to illustrate the invention but not restricted to the following:

EXAMPLE I

This example demonstrates the synthesis of 1,5-Bis(-methacryloxypropyl) 1,1,5,5-tetra kis(trimethylsiloxy) 3,3-dimethyl-trisiloxane (BIS). 13 g sulfuric acid is added in a dropwise manner to 5 g ethanol (medical grade) and 10 g of water in a flask equiped with a magnetic stirrer. If the sulfuric acid is added at a rate of one to two drops per second, a water bath is not necessary (any faster drop rate, and a water bath should be used for cooling).

49.62 g (0.2 mole) of methacryloxypropyl trimethoxy silane, 17.63 g (0.1 mole) of dimethyldiacetoxysilane, and 43.48 g (0.4 mole) of trimethyl acetoxy silane are placed in a flask equipped with an ice bath and a magnetic stirrer. Then 13 g of ethanol/sulfuric acid is added in a dropwise manner to the mixture while stirring. Continue ice bath for five minutes after the entire amount of ethanol/sulfuric acid has been added to the mixture. The mixture should be stirred for up to three days at room temperature to assure complete reaction. The organic (upper) layer is separated from the rest. The organic layer is washed with a 5% aquious solution of Sodium Bicarbonate of equal volume, and allowed to separate. The organic layer is dried over anhydrous sodium sulfate and filtered. The remaining by-product (ethyl acetate) is stripped off by means of a vacuum stripper or a vacuum still at a temperature ranging from 35° to 45° depending upon the degree of vacuum pulled. Refrigerated storage is recommended to prevent premature reactions.

EXAMPLE II

This example demonstrates the polymerization of the novel polymer by copolymerizing multifunctional siloxanyl alkyl ester prepared in Example I and an ester of methacrylic acid.

A rod is formed by copolymerizing 45 parts by weight of BIS, 47 parts by weight of methyl methacrylate, (MMA), 5 parts by weight of ethyleneglycol monomethacrylate, (HEMA), and 2 parts by weight of ethylene glycol dimethacrylate, (EDMA), in the presence of 0.25 parts by weight of benzoyl peroxide, (BPO) and placed in a glass tube and sealed. Polymerization is promogated in a water bath maintained at 70° C. for 12 hours. Post-cured in a convection oven at 85° C. for 24 hours. Contact lens blanks and lenses are prepared by conventional lathe cutting techniques. The lenses are hard, transparent, and highly oxygen permeable.

EXAMPLE III

This example demonstrates the synthesis of 1,5,9,-tris(methacryloxypropyl) 1,1,5,9,9-penta-kis(trimethylsiloxy) tetramethylpentasiloxane (PENTA).

Procedures in Example I are exactly followed except 23.51 g (0.1333 mole) of dimethyldiacetoxy silane and 44.07 g (0.333 mole) trimethylacetoxysilane are used to form a more complex molecule having three methacryl end groups for crosslinking.

EXAMPLE IV

This example demonstrates the polymerization of the novel polymer by copolymerizing the multifunctional siloxanyl alkyl ester prepared in Example III and an ester of methacrylic acid.

A rod is formed by copolymerizing 40 parts by weight of PENTA, 53 parts by weight of MMA, 5 parts by weight of HEMA and 2 parts by weight of diethylene glycol dimethacrylate in the presence of 0.25 parts by weight of BPO and placed in a glass tube and sealed. Polymerization is promogated in a water bath maintained at 70° C. for 12 hours. Post-cured in a convection oven at 85° C. for 24 hours. Contact lens blanks and lenses are fabricated by conventional lathe cutting techniques. The lenses are hard, transparent and highly oxygen permeable.

EXAMPLE V

This example demonstrates the syntheses of 1,5,9,13-tetrakis9methacryloxypropyl)1,1,5,9,13,13-hexakis-trimethylsiloxyl)hexamethylhepta siloxane, (HEXA).

Procedures in Example I are followed except 25.45 g (0.15 mole) of dimethyldiacetoxy silane and 39.66 g (0.30 mole) of trimethylacetoxy silane for acomplex molecule having molecular weight of 14241.1 and four methacryl end groups for crosslinking.

EXAMPLE VI

This example demonstrates the polymerization of the novel polymer by copolymerizing the multifunctional siloxanyl alkyl ester prepared in Example V, an ester of methacrylic acid, and an ester of itaconic acid.

A rod is formed by copolymerizing 46 parts by weight of HEXA, 23.5 parts bu weight of MMA, 23.5 parts by weight of dimethylitaconate, 5 parts by weight of HEMA, and 2 parts by weight of EDMA in the presence of 0.25 parts by weight of 2,2-Azobis(2-methylpropionitrile) and placed in a glass tube and sealed. Polymerization is promogated in a water bath maintained at 70° C. for 12 hours. Post-cured in a convection oven at 85° C. for 24 hours. Contact lens blanks and lenses are fabricated by conventional lathe cutting techniques. The lenses are hard, transparent, and highly oxygen permeable.

EXAMPLE VII

This example demonstrates the syntheses of tris(methacryloxymethyldimethylsiloxy)methacryloxypropylsiloxane, (TRIMA).

24.81 g (0.1 mole) of methacryloxypropyltrimethoxysiloxane, 47.22 g (0.33 mole) of chlormethyldimethylchlorosilane, and 50 g of ethyl ether are palced is a flask equipped with a magnetic stirrer and agitated for 5 minutes. In a separate flask 5 g of sodium bicarbonate is dissolved in 50 g of water. The sodium bicarbonate solution is placed in a flask equipped with an ice bath, a magnetic stirrer, and additional funnel with valve to control flow, and a vent port connected to another flask filled with 20% aqueous solution of sodium bicarbonate. The silane mixture is placed in the additional funnel and dropped at a rate of one drop every two seconds. A temperature of 10° C. is maintained for one hour after all of the silane mixture is added, the mix is stirred for 2 hours at room temperature. The mixture is then placed is a sepatory funnel and allowed to separate. The solvent is removed from the organic layer by distillation. The product is then mixed with 100 g of dimethylformamide, 12.42 g of potassium methacrylate and 75 g of methacrylic solvent removed by distillation. TRIMA is then washed twice with 5% aqueous solution sodium bicarbonate of equal volumes over anhydrous sodium sulfate. The remaining by-products are removed by vacuum distillation. Refrigerated storage is recommended to prevent premature reactions.

EXAMPLE VIII

This example demonstrates the polymerization of the novel polymer by copolymerizing the multifunctional siloxanyl alkyl ester prepared in Example VII and a ester of methacrylic acid.

A rod is formed by copolymerizing 47 parts by weight of TRIMA, 47.5 parts by weight of MMA, 5 parts by weight of HEMA, and 0.5 parts by weight of EDMA in the presence of 0.25 parts by weight of BPO and placed in a glass tube and sealed. Polymerization is promogated in a water bath maintained at 70° C. for 12 hours. Post-cured in a convection oven at 85° C. for 24 hours. Contact lens blanks and lenses are fabricated by conventional lathe cutting techniques. The lenses are hard, transparent, and highly permeable.

Other multifunctional siloxanyl alkyl esters can be prepared to have numerous reactive sites and configurations by changing the molar relationships of the intermediaries and constituents. It also has been found that by replacing at least one methacryloxy alkyl group with a dihydroxypropyl alkyl group, the siloxanyl alkyl ester can be made to be self wetting.

Various modifications can be made without departing from the spirit of this invention or scope of the appended claims. The constants set forth in the disclosure are given as examples and are in no way final or binding. In view of the above, it will be seen that several objects of the invention are achieved and other advantages are obtained. As many changes could be made in the above constructions and methods without departing from the scope of the invention, it is intended that all matter contained in the above description shall be interpreted as illustrative and not in a limiting sense.

I claim:

1. An oxygen permeable material for the manufacture of contact lenses formed by copolymerizing (a) from 5 to 90% by weight of a multifunctional siloxanyl alkyl ester, monomer having two or more α, ω terminally bonded through divalent hydrocarbon groups to an activated unsaturated group, (b) an effective amount of a copolymerizable monomer up to 90% by weight of an ester of acrylic or methacrylic acid or mixture thereof, or from (c) an effective amount of a copolymerizable monomer up an ester of itaconic acid, (d) from 0.5 to 40% by weight of a hydrophilic monomer for a surface wetting agent, and (e) from 0 to 20% by weight of an ester crosslinking agent in the presence of a free radical or a photo initiator.

2. A composition as defined in claim 1 wherein said multifunctional siloxanyl alkyl ester monomer having two or more α, ω terminally bonded through divalent hydrocarbon groups to an activated unsaturated groups; includes at least one of the following group:
tetrakis-(trimethylsiloxy)bis(methacryloxypropyl)-disiloxane
tetrakis-(trimethylsiloxy)bis(methacryloxypropyl)dimethyltrisiloxane
pentakis-(trimethylsiloxy)tris(methacryoxypropyl)tetramethyl-pentasiloxane
hexakis-(trimethylsiloxy)tetrakis-(methacryloxpropyl)-hexamethyl heptasiloxane
tris-(methacryloxymethyldimethylsiloxy)methacryloxypropylsiloxane
tetrakis-(methacryloxymethyldimethylsiloxy)tetramethylcyclotetra-siloxane
tetrakis-(methacryloxymethyldimethylsiloxy)siloxane.

3. A composition as defined in claim 1 wherein said ester of acrylic or methacrylic acid include at least one of the following group:
butyl acrylate, butyl methacrylate
cyclohexyl acrylate, cyclohexyl methacrylate
2-ethylacrylate, 2-ethylmethacrylate
glycidyl acrylate, glycidyl methacrylate
hexyl acrylate, hexyl methacrylate
lauryl acrylate, lauryl methacrylate
methyl acrylate, methyl methacrylate
stearyl acrylate, stearyl methacrylate.

4. A composition as defined in claim 1 wherein said ester of itaconic acid include at least one of the following group:
butyl itaconate
dibutyl itaconate
methyl itaconate
dimethyl itaconate
phenyl itaconate
diphenyl itaconate.

5. A composition as defined in claim 1 wherein said a hydrophiliomonomer for a surface wetting agent include at least one of the following group:
acrylamide
2-acrylamido-2 methyl propane sulfonic acid
t-butylaminoethyl methacrylate
dimethylaminoethylacrylate, dimethylaminoethylmethacrylate
N-(1,1-dimethyl-3-oxobutyl)acrylamide
glacial acrylic acid, glacial methacrylic acid
glyceryl acrylate, glyceryl methacrylate
itaconic acid propylene glycolmonoacrylate, propylene glycol monomethacrylate ethylene glycol monoacrylate, ethylene glycol monomethacrylate methacrylamide morpholinoethyl acrylate, morphilinoethyl methacrylate piperidinoethyl acrylate, piperidinoethyl methacrylate triethylene glycol methacrylate N-vinyl pyrrolidone dihydroxypropyl acrylate, dihydroxypropyl methacrylate.

6. A composition as defined in claim 1 wherein said an ester crosslinking agent include at least one of the following group:

bis(methacryloxypropyl)tetramethyldisiloxane 1,3 bis(glycidoxypropyl)tetramethyldisiloxane divinyl diphenyl silane ethylene glycol diacrylate, ethylene glycol dimethacrylate diethylene glycol dicacrylate, diethylene glycol dimethacrylate trimethylpropane triacrylate, trimethylpropane trimethacrylate triethylene glycol diacrylate, triethylene glycol dimethacrylate tetraethylene glycol diacrylate, tetraethylene glycol dimethacrylate.

* * * * *